United States Patent
Lindoff et al.

(10) Patent No.: US 10,098,129 B2
(45) Date of Patent: Oct. 9, 2018

(54) HANDLING OF SIMULTANEOUS NETWORK COMMUNICATION TRANSMISSION AND D2D COMMUNICATION RECEPTION OR SIMULTANEOUS NETWORK COMMUNICATION RECEPTION AND D2D COMMUNICATION TRANSMISSION

(71) Applicant: Telefonaktiebolaget L M Ericsson (publ), Stockholm (SE)

(72) Inventors: Bengt Lindoff, Bjärred (SE); Gabor Fodor, Hässelby (SE); Muhammad Kazmi, Bromma (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 40 days.

(21) Appl. No.: 14/784,267

(22) PCT Filed: Dec. 3, 2013

(86) PCT No.: PCT/EP2013/075400
§ 371 (c)(1),
(2) Date: Oct. 13, 2015

(87) PCT Pub. No.: WO2014/180517
PCT Pub. Date: Nov. 13, 2014

(65) Prior Publication Data
US 2016/0066356 A1    Mar. 3, 2016

Related U.S. Application Data

(60) Provisional application No. 61/821,107, filed on May 8, 2013.

(51) Int. Cl.
*H04W 72/08* (2009.01)
*H04W 52/38* (2009.01)
(Continued)

(52) U.S. Cl.
CPC ....... *H04W 72/082* (2013.01); *H04W 52/383* (2013.01); *H04W 72/10* (2013.01);
(Continued)

(58) Field of Classification Search
CPC . H04W 52/383; H04W 52/146; H04W 92/18; H04W 72/1257; H04W 72/042;
(Continued)

(56) References Cited

U.S. PATENT DOCUMENTS 6,097,762 A * 8/2000 Suzuki ............... H04L 27/2637
332/149
6,606,500 B1 * 8/2003 Kronestedt ........... H04B 1/715
375/132
(Continued)

FOREIGN PATENT DOCUMENTS

| WO | 2009/009264 A2 | 1/2009 |
| WO | 2012034269 A1 | 3/2012 |
| WO | 2012/049351 A1 | 4/2012 |

OTHER PUBLICATIONS

Fodor, G. et al.,"A Distributed Power Control Scheme for Cellular Network Assisted D2D Communications," IEEE 2011 Global Telecommunications Conference (GLOBECOM 2011), Dec. 5, 2011, pp. 1-6, XP032118739, doi: 10.1109/GLOBECOM.2011.6133537; ISBN: 978-1-4244-9266-4.
(Continued)

*Primary Examiner* — Hassan Kizou
*Assistant Examiner* — Roberta A. Shand
(74) *Attorney, Agent, or Firm* — Patent Portfolio Builders PLLC

(57) ABSTRACT

A radio frequency communication device (100, 320) comprising a radio frequency communications interface (130) and a controller (110), wherein said controller (110) is configured to: establish network communication with a
(Continued)

network node (200, 310) and to establish device-to-device communication with a second radio frequency communication device (325) via said radio frequency communication interface (130). The controller is further configured to determine whether there is to be performed a simultaneous communication comprising a network transmission over said network communication with said network node (200, 310) and a D2D reception over said device-to-device communication with said second radio frequency communication device (325) or a network reception over said network communication with said network node (200, 310) and a D2D transmission over said device-to-device communication with said second radio frequency communication device (325); determine if there is a transmission problem related to said simultaneous communication; and if so determine a mitigation technique; and perform said network transmission and said D2D reception or said network reception and said D2D transmission according to said mitigation technique to mitigate said transmission problem.

34 Claims, 5 Drawing Sheets

(51) Int. Cl.
  *H04W 72/10*    (2009.01)
  *H04W 72/12*    (2009.01)
  *H04W 76/14*    (2018.01)
  *H04W 52/14*    (2009.01)
  *H04W 88/04*    (2009.01)
  *H04W 76/15*    (2018.01)

(52) U.S. Cl.
  CPC ........ *H04W 72/1257* (2013.01); *H04W 76/14* (2018.02); *H04W 52/146* (2013.01); *H04W 76/15* (2018.02); *H04W 88/04* (2013.01)

(58) Field of Classification Search
  CPC ................. H04W 72/048; H04W 72/1215; H04W 72/10
  See application file for complete search history.

(56) References Cited

U.S. PATENT DOCUMENTS

| | | | |
|---|---|---|---|
| 6,680,950 B1 | 1/2004 | Nagata et al. | |
| 6,707,808 B1 | 3/2004 | Vedrine | |
| 8,213,360 B2* | 7/2012 | Koskela | H04W 36/30 |
| | | | 370/328 |
| 8,780,835 B2* | 7/2014 | Hakola | H04W 74/008 |
| | | | 370/245 |
| 8,838,046 B2 | 9/2014 | Fu et al. | |
| 8,885,507 B2* | 11/2014 | Chen | H04W 72/0406 |
| | | | 370/252 |
| 8,913,579 B2* | 12/2014 | Zou | H04W 76/023 |
| | | | 370/329 |
| 8,989,093 B2 | 3/2015 | Han et al. | |
| 9,030,984 B2* | 5/2015 | Yang | H04W 52/242 |
| | | | 370/311 |
| 9,173,124 B2* | 10/2015 | Heo | H04W 4/70 |
| 9,380,481 B2 | 6/2016 | Narasimha et al. | |
| 9,854,044 B2* | 12/2017 | Kazmi | H04W 76/14 |
| 2002/0090088 A1 | 7/2002 | Onishi | |
| 2004/0240404 A1 | 12/2004 | Ibrahim et al. | |
| 2008/0069039 A1 | 3/2008 | Li et al. | |
| 2009/0017829 A1 | 1/2009 | Laroia et al. | |
| 2009/0046596 A1 | 2/2009 | Ewe et al. | |
| 2009/0318087 A1 | 12/2009 | Mattila et al. | |
| 2009/0325625 A1* | 12/2009 | Hugl | H04W 52/16 |
| | | | 455/522 |
| 2010/0093364 A1 | 4/2010 | Ribeiro et al. | |
| 2010/0189046 A1 | 7/2010 | Baker et al. | |
| 2011/0255450 A1 | 10/2011 | Wang et al. | |
| 2011/0268004 A1 | 11/2011 | Doppler et al. | |
| 2011/0274092 A1 | 11/2011 | Liu et al. | |
| 2011/0275382 A1 | 11/2011 | Hakola et al. | |
| 2011/0287794 A1 | 11/2011 | Koskela et al. | |
| 2011/0300892 A1 | 12/2011 | Hakola et al. | |
| 2012/0028663 A1 | 2/2012 | Nejatian et al. | |
| 2012/0051315 A1* | 3/2012 | Wang | H04W 72/082 |
| | | | 370/329 |
| 2012/0093098 A1* | 4/2012 | Charbit | H04W 72/04 |
| | | | 370/329 |
| 2012/0120892 A1 | 5/2012 | Freda et al. | |
| 2012/0122467 A1 | 5/2012 | Auer et al. | |
| 2012/0129540 A1* | 5/2012 | Hakola | H04W 72/042 |
| | | | 455/450 |
| 2012/0163252 A1 | 6/2012 | Ahn et al. | |
| 2012/0250636 A1 | 10/2012 | Wang et al. | |
| 2013/0012191 A1 | 1/2013 | Charbit et al. | |
| 2013/0059583 A1 | 3/2013 | Van Phan et al. | |
| 2013/0128858 A1 | 5/2013 | Zou et al. | |
| 2013/0150058 A1* | 6/2013 | Lim | H04W 72/048 |
| | | | 455/450 |
| 2013/0157676 A1 | 6/2013 | Baek et al. | |
| 2013/0230032 A1 | 9/2013 | Lu et al. | |
| 2015/0016410 A1 | 1/2015 | Lee et al. | |
| 2015/0146687 A1 | 5/2015 | Kim et al. | |
| 2016/0066356 A1 | 3/2016 | Lindoff et al. | |
| 2016/0081073 A1 | 3/2016 | Lindoff et al. | |

OTHER PUBLICATIONS

Doppler, K. et al., "Device-to-Device Communications; Functional Prospects for LTE-Advanced Networks," IEEE 2015 International Conference on Communications Workshop, Jun. 14, 2009, pp. 1-6, XP031212460; ISBN: 978-1-424-3437-4.

Hongnian, Xing et al., "The Investigation of Power Control Schemes for Device-to-Device Communication Integrated into OFDMA Cellular System," IEEE 21st International Symposium on Personal Indoor and Mobile Radio Communications (PIMRC), Istanbul, Turkey, Sep. 26-30, 2010, pp. 1775-1780, XP031837914, ISBN: 978-1-4244-8017-3.

Office Action in related U.S. Appl. No. 14/784,266 dated May 19, 2016.

Office Action in related U.S. Appl. No. 14/784,266 dated Oct. 20, 2016.

International Search Report issued in corresponding International application No. PCT/EP2013/075400, date of completion of the search May 23, 2014.

Written Opinion of the International Searching Authority issued in corresponding International application No. PCT/EP2013/075400, dated Jul. 29, 2014.

Fodor, Gábor et al., "Design Aspects of Network Assisted Device-to-Device Communications," IEEE Communications Magazine, May 2011.

Xiaogang, Ran et al. "D2D Resource Allocation under the Control of BS," University of Electronic Science and Technology of China, 2013, https://mentor.ieee.org/802.16/dcn/13/16-13-0123-01-000n-d2d-resource-allocation-under-thecontrol-of-bs.docx.

Zulhasnine, Mohammad et al. "Efficient Resource Allocation for Device-to-Device Communication Underlying LTE Network," 2010 IEEE 6th International Conference on Wireless and Mobile Computing, Networking and Communications.

Yu, Chia-Hao et al., "Power Optimization of Device-to-Device Communication Underlaying Cellular Communication," in Proceedings of IEEE International Conference on Communications, Jun. 2009, pp. 1-5.

Lee, Namyoon et al. "Power Control for D2D Underlaid Cellular Networks: Modeling, Algorithms and Analysis". JSAC on D2D Communications. May 2013.

Belleschi, Marco et al, "Performance Analysis of a Distributed Resource Allocation Scheme for D2D Communications," GLOBECOM Workshops 2011, pp. 358-362.

(56) References Cited

OTHER PUBLICATIONS

Phunchongharn, Phond et al. "Resource Allocation for Device-to-Device Communications Underlaying LTE-Advanced Networks", IEEE Wireless Communication, Sep. 2012.
3GPP, "3rd Generation Partnership Project; Technical Specification Group Services and System Aspects; Feasibility study for Proximity Services (ProSe), Release 12," 3GPP TR 22.803, V12.1.0 (Mar. 2013).
International Search Report issued in corresponding International application No. PCT/EP2013/075415, date of completion of the search Jul. 25, 2014.
Written Opinion of the International Searching Authority issued in corresponding International application No. PCT/EP2013/075415, dated Jul. 31, 2014.
International Search Report issued in related International application No. PCT/EP2013/075416, date of completion of the search Mar. 20, 2014.
Written Opinion of the International Searching Authority issued in related International application No. PCT/EP2013/075416, dated Mar. 27, 2014.
Office Action dated Aug. 30, 2017 in related U.S. Appl. No. 14/784,265.
Office Action dated Feb. 27, 2017 in related U.S. Appl. No. 14/784,265.
Office Action in European Application No. 13 814 060.3 dated Jun. 15, 2018.

\* cited by examiner

HANDLING OF SIMULTANEOUS NETWORK COMMUNICATION TRANSMISSION AND D2D COMMUNICATION RECEPTION OR SIMULTANEOUS NETWORK COMMUNICATION RECEPTION AND D2D COMMUNICATION TRANSMISSION

TECHNICAL FIELD

This application relates to a method, a network node, a communication device, and a computer-readable storage medium for improved handling of simultaneous network communication transmission and D2D communication reception or simultaneous network communication reception and D2D communication transmission, and in particular to a method, a network node, a communication device and a computer-readable storage medium for improved handling of simultaneous network communication transmission and D2D communication reception or simultaneous network communication reception and D2D communication transmission by mitigating transmission problems in network assisted device-to-device communication networks.

BACKGROUND

The present invention relates to Device-to-Device (D2D) Communications in the Cellular Spectrum. Although the idea of enabling D2D communications as a means of relaying in cellular networks was proposed by some early works on ad hoc networks, the concept of allowing local D2D communications to (re)use cellular spectrum resources simultaneously with ongoing cellular traffic is relatively new. Because the non-orthogonal resource sharing between the cellular and the D2D layers has the potential of the reuse gain and proximity gain at the same time increasing the resource utilization, D2D communications underlying cellular networks has received considerable interest in the recent years.

Specifically, in 3GPP LTE networks, such LTE Direct (D2D) communication can be used in commercial applications, such as cellular network offloading, proximity based social networking, or in public safety situations in which first responders need to communicate with each other and with people in the disaster area.

D2D communication entities using an LTE Direct link may reuse the same physical resource blocks (PRB) as used for cellular communications either in the downlink or in the uplink or both. The reuse of radio resources in a controlled fashion can lead to the increase of spectral efficiency at the expense of some increase of the intra-cell interference. Typically, D2D communicating entities use UL resources such as UL PRBs or UL time slots, but conceptually it is possible that D2D (LTE Direct) communications takes place in the cellular DL spectrum or in DL time slots. For ease of presentation, in the present disclosure we assume that D2D links use uplink resources, such as uplink PRBs in an FDD or uplink time slots in an a cellular TDD system, but the main ideas would carry over to cases in which D2D communications take place in DL spectrum as well.
Simultaneous D2D and Cellular Transmissions in D2D Communications FIG. 3 shows a principal schematic sketch over a network assisted D2D system. One or more network nodes 310 are in control over at least one radio frequency communication device 320, 325 and 327 (also referenced D1, D2 and D3), of which at least two (320 D1 and 325 D2) are also is involved with D2D communication with each other. The network node 310 allocates time-frequency resources for D2D transmission, and is also in control over maximum allowed transmission (TX) power used in the D2D communication. In a typical scenario, the network node 310 allocates D2D resources for approximately 200-500 ms and during that time period, then each radio frequency communication device 320, 325 makes autonomous selections of MCS (modulation and coding scheme) and executes commands such as HARQ (hybrid automatic repeat request). At the end of each time period, the radio frequency communication device 320 reports signal quality status and/or other transmission quality measures, and receives new D2D resources to use for the next time period (i.e. 200-500 ms).

Furthermore, typically UpLink (UL) spectrum/resources are used for D2D, as this is beneficial from an interference control perspective. And, as D2D communication will typically not take up too much of the spectrum resources into account, it is far from efficient to allocate an entire frequency bandwidth in a sub frame for D2D communication. Hence, both UL (and Downlink (DL)) traffic and D2D traffic need to able to share the same sub frames, for example sharing a frequency. Such sharing of same sub frame for UL (or DL) communication (controlled by a network node) and D2D communication (as the radio frequency communication device autonomously decides when to transmit and to receive in a sub frame) might imply that a radio frequency communication device might need to transmit to the network node while simultaneously receiving D2D communication from a second radio frequency communication device in the same sub frame.

FIG. 5 shows an example of how simultaneous cellular and D2D allocation in the UL can be made. In time block or time period A, the first radio frequency communication device 320 D1 receives data over a D2D link and simultaneously transmits a physical uplink control channel (PUCCH) to the network node 310. In time period B, the second radio frequency communication device 325 D2 transmits a physical UL shared channel (PUSCH) to the network node 310 and simultaneously receives information from the first radio frequency communication device 320 D1. In time period C, both the first radio frequency communication device 320 D1 and the third radio frequency communication device 327 D3 transmit a PUSCH respectively to the network node 310. In time period D, the second radio frequency communication device 325 D2 transmits a physical UL shared channel (PUSCH) to the network node 310, while in time period E, the second radio frequency communication device 325 D2 transmit to the first radio frequency communication device 325 D1 in D2D and the third radio frequency communication device 327 D3 transmit a PUSCH to the network node 310.

The performance of multi-channel radio systems in general, and orthogonal frequency division multiplexing (OFDM) systems in particular, can be severely impacted by the interference due to concurrent transmissions on adjacent channels. This is because radiation or "leakage" of energy from adjacent frequency channels can cause significant interference. This ACI can be more severe when the transmission power level on the adjacent channel is high, especially when there is a large imbalance between the transmission levels on adjacent channels. For example, in 3GPP the Adjacent Channel Leakage Power ration (ACLR) is an example of a measurement that can be used to characterize the leakage power problem.
Problems with Existing Solutions The scheduling flexibility requirement desired and discussed above, (namely that a device simultaneously should be able to transmit to a network node and receive information from another radio frequency communication device in the same sub frame, or vice versa, receiving from the network node and transmitting to the second radio frequency communication device) gives rise to the following problems.

It should be noted that although the teachings herein are disclosed as transmitting on a cellular (network) link while receiving on a D2D link, the same problems also exist in the opposite situation, namely transmitting over a D2D link (using cellular downlink resources) while receiving on a cellular link.

FIGS. 6A and 6B illustrate a problem that may arise due to such in-band emission (for instance LTE 20 MHz). In FIG. 6A, showing a time period A (referring to time period A in FIG. 5), the first radio frequency communication device 320 D1 transmits a PUCCH to the network node 310 (referenced D1→NW) and at the same time also receives data in D2D mode from the second radio frequency communication device 325 D2 (referenced D1←D2). Assuming the PUCCH is transmitted with higher power than the D2D part is received at (due to e.g. path loss differences or different SINR (Signal-to-Noise-and-Interference-Ratio) targets); the D2D reception may be affected by transmission (TX) leakage (referenced LA) from the PUCCH transmission. However, in this case the imbalance is not too large and hence transmission leakage will not significantly affect the D2D reception. This is exemplified in the D2D signal constellation (below in FIG. 6A) (assuming a QPSK signal is transmitted on one sub-carrier).

However, in FIG. 6B, showing a time period B (referring to time period B in FIG. 5), where D2 is transmitting a PUSCH (referenced D2→NW) while at the same time D2D-communicating with D1 and receiving information from D1 (referenced D2←D1), the transmission leakage (referenced LB) from the network transmission severely impacts the D2D reception at D2. This is seen in the signal constellation (below in FIG. 6B) where the QPSK points are blurred. The extra noise introduced in the transmitter will make the D2D reception much more sensitive to interference in D2D reception (RX) at D2, implying a lower D2D performance etc. Since the network scheduler does not have all information about the D2D communication, for instance the distance between D2D and the amount of data transmitted between the devices (and hence transmission power needed), it is hard for the network to detect such transmission (TX) imbalance scenarios.

Since device transmitters, especially the power amplifier (PA), are not ideal due to non-linearities, the transmission on a first set of Resource Blocks (RBs) gives rise to spectral emission on adjacent RBs within the system frequency band, so-called ACI. Furthermore, as the transmission power is in the range of −20 to 23 dBm, (per PRB=180 kHz) while the reception signal level can be in the order of −70 to −125 dBm (per 180 kHz), the reception signal is up to 100 dB weaker than the transmitted signal. Hence, even if the inband emission is very low (for example suppressed by −50 dBc relative the transmitted power spectral density), the received signal may still be 10th:s of dB below that level and hence buried in noise and undetectable by the device.

One prior art method to solve this problem is to always avoid scheduling UL (and DL) resources to a device in a same sub frame as ongoing D2D communication. However, as mentioned above, such approach will significantly reduce spectrum usage and spectrum capacity.

Therefore, there is a need for a method and a radio frequency communication device that takes care of problems as described above without wasting resources.

SUMMARY

The problem, that the inventors has realized after inventive and insightful reasoning and that the present invention aims to solve, arises in situations when a radio frequency communication device in so called network (NW) assisted device-to-device (D2D) mode detects a need for reception of data from another radio frequency communication device (D2D peer device) and simultaneously in same frequency/system bandwidth should transmit to a network node, such as a cellular base station (BS) or access point (AP). In such situations, transmitter emissions significantly affect the reception. Such adjacent channel interference (ACI) is a new and specific problem in network assisted D2D communications when simultaneous reception on the D2D link and transmission on the cellular link is allowed.

It is an object of the teachings of this application to overcome or at least mitigate the problems listed above by providing a radio frequency communication device comprising a radio frequency communications interface and a controller, wherein said controller is configured to establish network communication with a network node and to establish device-to-device communication with a second radio frequency communication device via said radio frequency communication interface; determine whether there is to be performed a simultaneous communication comprising a network transmission over said network communication with said network node and a D2D reception over said device-to-device communication with said second radio frequency communication device or a network reception over said network communication with said network node and a D2D transmission over said device-to-device communication with said second radio frequency communication device; determine if there is a transmission problem related to said simultaneous communication; and if so determine a mitigation technique; and perform said network transmission and said D2D reception or said network reception and said D2D transmission according to said mitigation technique to mitigate said transmission problem.

In one embodiment the communication device is a mobile communications terminal.

It is a further object of the teachings of this application to overcome the problems listed above by providing a method for use in a radio frequency device according to above.

It is an object of the teachings of this application to overcome or at least mitigate the problems listed above by providing a network node comprising a radio frequency communications interface and a controller, said network node being configured to serve at least one first radio frequency communication device being configured for both network communication and for device-to-device communication with a second radio frequency communication device, wherein said controller is configured to determine a mitigation technique to mitigate a problem related to transmission or reception of signals experienced by or expected to be experienced by the first radio frequency communication device for simultaneous network transmission over said network communication with said network node and a D2D reception over said device-to-device communication with said second radio frequency communication device or for simultaneous network reception over said network communication with said network node and a D2D transmission over said device-to-device communication with said second radio frequency communication device; and transmit said mitigation technique to said first radio frequency communication device.

It is a further object of the teachings of this application to overcome the problems listed above by providing a method for use in a network node according to above.

It is a further object of the teachings of this application to overcome the problems listed above by providing a computer readable medium comprising instructions that when loaded into and executed by a controller, such as a processor, cause the execution of a method according to herein.

The inventors of the present application have realized, after inventive and insightful reasoning, that by enabling a radio frequency communication device to determine that there is a risk for simultaneous D2D reception and transmission of data to a network node (or vice-versa) in a same sub frame, it determines which action (reception or transmission) to prioritize.

The radio frequency communication device is able to determine any possible problems in advance, since the sub frames used for D2D transmission respective reception is agreed upon between the device and the other device involved in the communication. Furthermore, the radio frequency communication device knows when to transmit to a NW node via received scheduling grant or time instance to transmit a scheduling request or Random Access a certain time period ahead of the actual transmission. The time period is pre-defined and depends on the communication standard. For LTE it is 4 ms.

The radio frequency communication device is configured to determine which mitigation technique to select (or action to take) based on a set of prioritization rules that are described in more detail below. In some embodiments if certain conditions are fulfilled simultaneous reception and transmission might be possible. Furthermore, the prioritization rules use may be configurable and changed dynamically either by the network node, or the involved radio frequency communication devices.

In one embodiment the radio frequency communication device is also configured to report the action taken, i.e. the mitigation technique, to the network node and/or another radio frequency communication device when so is possible.

Embodiments of the invention also comprise corresponding methods and manners implemented in a network node managing a radio frequency communication device.

Other features and advantages of the disclosed embodiments will appear from the attached detailed disclosure.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
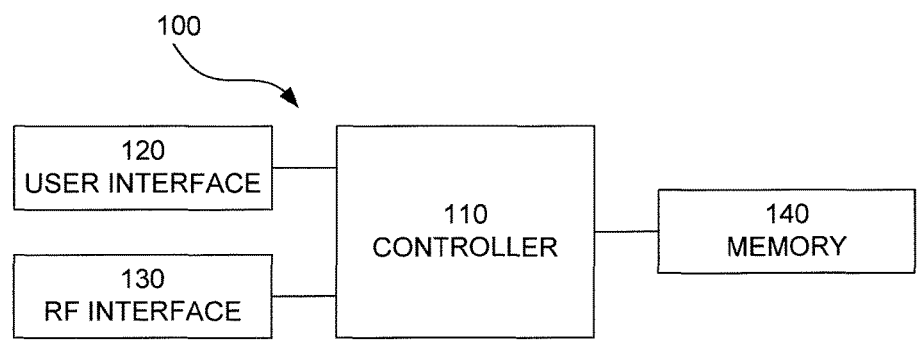
FIG. 1 shows a schematic view of a radio frequency communication device according to one embodiment of the teachings of this application.

FIG. 1 shows a schematic example of a radio frequency communication device 100 according to one embodiment of the teachings herein. In this example, the radio frequency communication device 100 is a mobile communications terminal, such as a mobile phone, a wireless computer tablet or a laptop computer enabled for wireless communication, but it should be noted that the teachings herein are not restricted to be used in mobile communications terminals, but may be used in any radio frequency communication device 100 that is arranged as will be disclosed herein. The radio frequency communication device 100 may comprise a user interface 120, which in the example embodiment of FIG. 1 may comprise at least one physical key, a visual data feedback unit, such as a display or Light Emitting Diode (LED) array. The radio frequency communication device 100 also comprises a controller 110 and a memory 140. The controller 110 may be implemented as one or several processors or other logic circuits, such as programmable logic circuits. The memory 140 may be implemented using any commonly known technology for computer-readable memories such as ROM, RAM, SRAM, DRAM, FLASH, DDR, EEPROM memory, flash memory, hard drive, optical storage or any combination thereof. The memory 140 is used for various purposes by the controller 110, such as for storing program instructions and application data.

The radio frequency communication device 100 further comprises a radio frequency (radio frequency) communication interface 130 which is configured to communicate to one or a combination of the standards Universal Mobile Telecommunications System (UMTS), 3GPP Long Term Evolution (LTE), High Speed Packet Access, HSPA, or Global System for Mobile communication, GSM. It should be noted that the teachings herein may also be implemented using other cellular communications standards. The radio frequency interface 130 is also configured to communicate according to one or a combination of at least one of the standards IEEE 802.11 (WiFi), Bluetooth®, NFC (Near Field Communication) or other short range (radio frequency) communication interface, RFID (Radio Frequency Identification) and ZigBee.

The controller 110 is operatively connected to the radio frequency communication interface 130 for communicating with other radio frequency communication devices as will be disclosed below with reference to FIG. 3.

Figure 2:
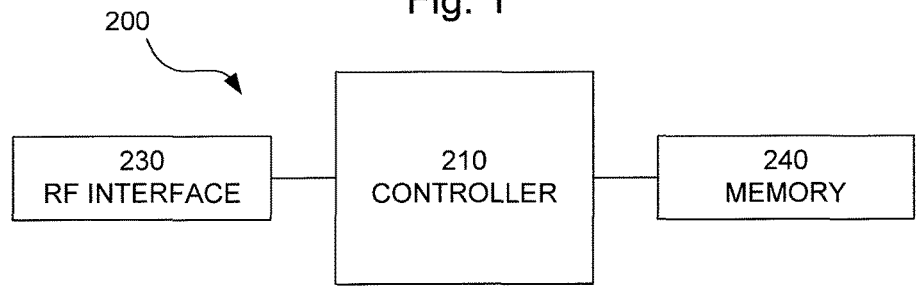
FIG. 2 shows a schematic view of a network node according to one embodiment of the teachings of this application.

FIG. 2 shows a schematic example of a network node 200 according to one embodiment of the teachings herein. In this example, the network node 200 is a base station, but it should be noted that the teachings herein are not restricted to be used in mobile communications networks, but may be used in any network that is arranged as will be disclosed herein. The network node 200 may thus be an access point. The network node 200 comprises a controller 210 and a memory 240. The controller 210 may be implemented as one or several processors or other logic circuits, such as programmable logic circuits. The memory 240 may be implemented using any commonly known technology for computer-readable memories such as ROM, RAM, SRAM, DRAM, FLASH, DDR, EEPROM memory, flash memory, hard drive, optical storage or any combination thereof. The memory 240 is used for various purposes by the controller 210, such as for storing program instructions and application data.

The network node 200 further comprises a radio frequency (radio frequency) communication interface 230 which is configured to communicate to one or a combination of the standards Universal Mobile Telecommunications System (UMTS), 3GPP Long Term Evolution (LTE), High Speed Packet Access, HSPA, or Global System for Mobile communication, GSM. It should be noted that the teachings herein may also be implemented using other cellular communications standards. The radio frequency interface 230 may alternatively be configured to communicate according to one or a combination of at least one of the standards IEEE 802.11 (WiFi), Bluetooth®, NFC (Near Field Communication) or other short range (radio frequency) communication interface, RFID (Radio Frequency Identification) and ZigBee, wherein the network node is an access point.

The controller 210 is operatively connected to the radio frequency communication interface 230 for communicating with radio frequency communication devices as will be disclosed below with reference to FIG. 3.

Figure 3:
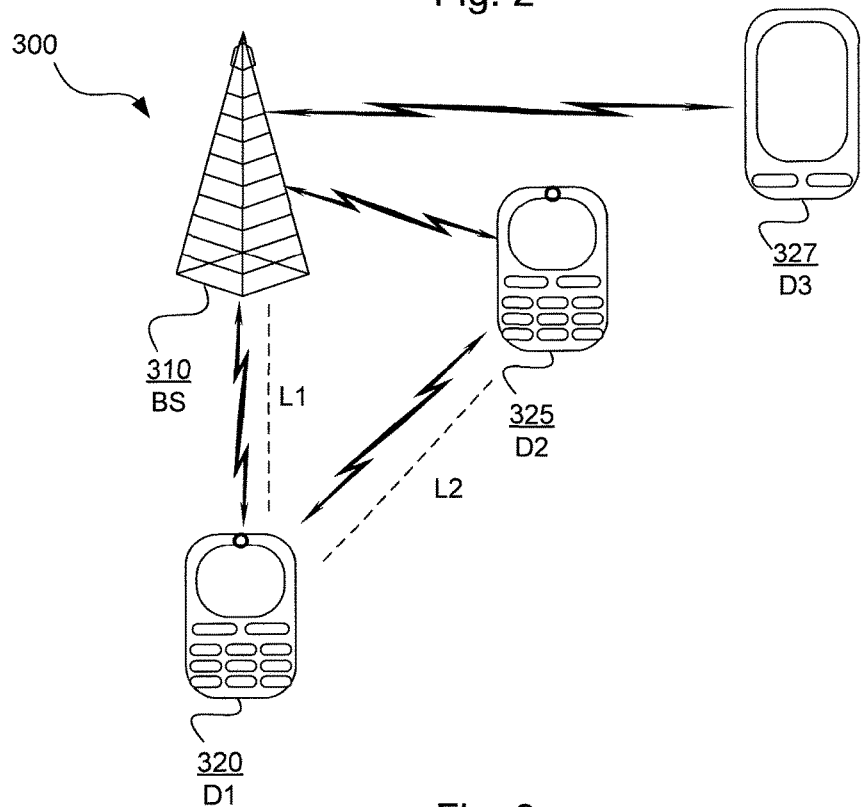
FIG. 3 shows a schematic view of a communication network comprising a communication device according to one embodiment of the teachings of this application.

FIG. 3 schematically shows a radio frequency communication network 300 according to the teachings herein. A network node 310 is arranged to communicate with a first radio frequency communication device 320, such as a user equipment (UE). The network node 310 may be arranged to communicate according to a cellular communication standard, such as LTE (Long-Term evolution) or 3GPP (3G Partner project) or other commonly known radio access technology (RAT), such as disclosed with reference to FIG. 2. The network node 310 is, thus, in this example, a base station (BS). The network node 310 may additionally or alternatively be arranged to communicate according to a data communication standard, such as IEEE802.11 (WiFi™) or Bluetooth™ or other commonly known radio access technology (RAT), such as disclosed with reference to FIG. 2. The network node 310 is, thus, in this example, an access point (AP).

It should be noted that the network node 310 may be arranged to communicate according to any RAT and the teachings herein are applicable in each circumstance. A network node may be an eNode B, a node B, a Base Station, cellular access point (AP), radio network controller, or relay etc. The network node may also be an access point configured to operate according to a non-cellular RAT, such as WiFi and others as disclosed with reference to FIG. 2. The same is also naturally true for the network node 200 of FIG. 2.

The radio frequency communication network 300 may also comprise a second radio frequency communication device 325, such as a user equipment. The first radio frequency communication device 320 is further configured to communicate with the second radio frequency communication device 325 (and vice versa) according to a device to device (D2D) communication standard, such as LTE Direct.

The radio frequency communication network 300 is thus arranged for network assisted device-to-device communication, wherein the network node 310 is configured for network assisted device-to-device communication.

As has been explained in the background section, problems arise when a device 320 attempts to communicate both with a network node 310 and another radio frequency communication device 325 at (substantially) the same time.

The radio frequency communication network 300 may also comprise additional radio frequency communication devices, such as a third radio frequency communication device 327. The third radio frequency communication device 327 is only involved in network communication and will thus not be discussed in further detail but it should be noted that the communication effected by the third radio frequency communication device 327 may be a cause of interference or other disturbances that the communication with the first and second radio frequency communication devices 320, 325 is subjected to.

Figure 4:
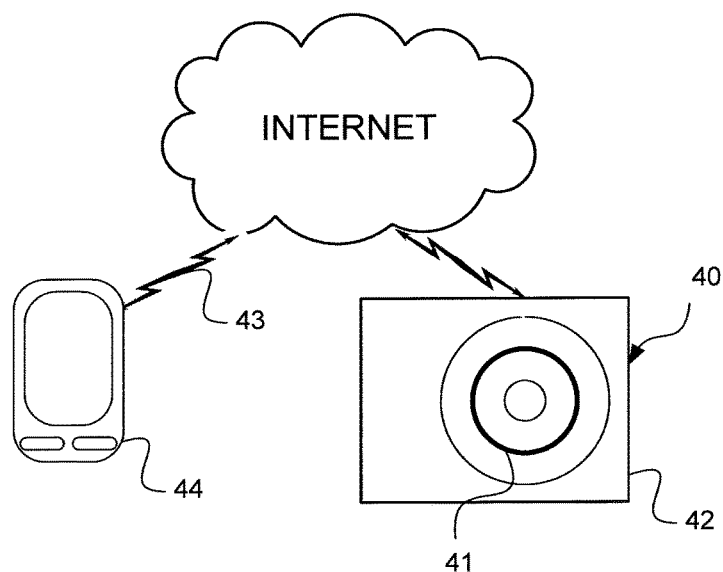
FIG. 4 shows a schematic view of a computer-readable medium according to one embodiment of the teachings of this application.
Figure 5:
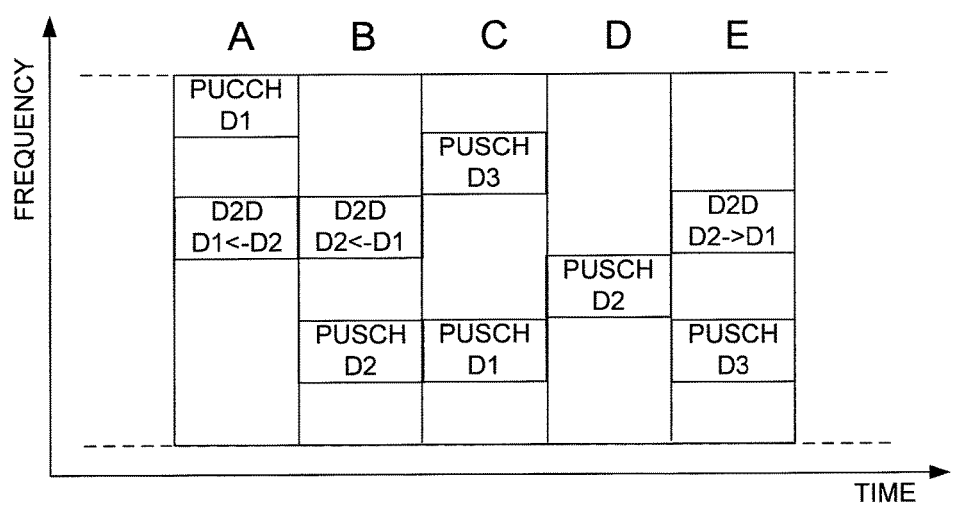
FIG. 5 shows a series of time blocks for a radio frequency communication device transmitting both to a network node and to another radio frequency communication device according to an embodiment of the teachings of this application.
Figure 6A:
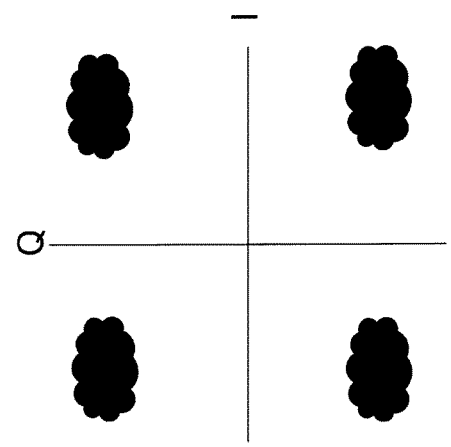
FIGS. 6A and 6B illustrate a problem occurring in the prior art.
Figure 6A:
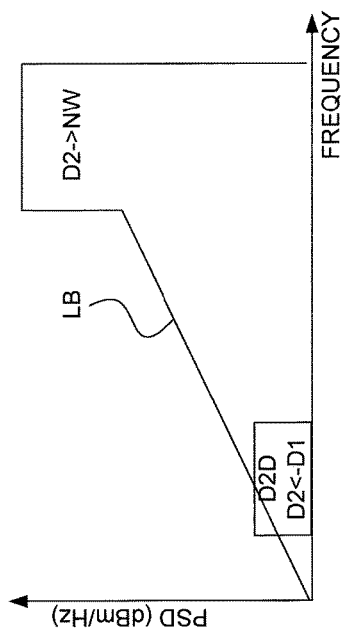
Figure 6B:
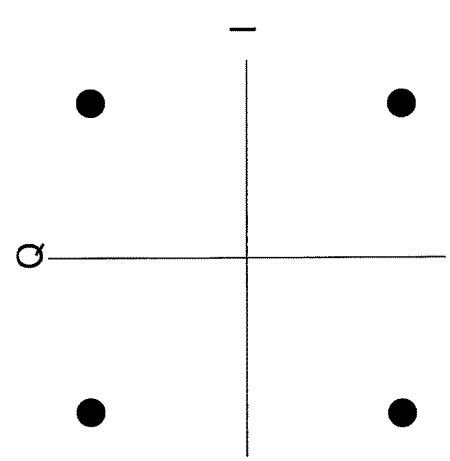
Figure 6B:
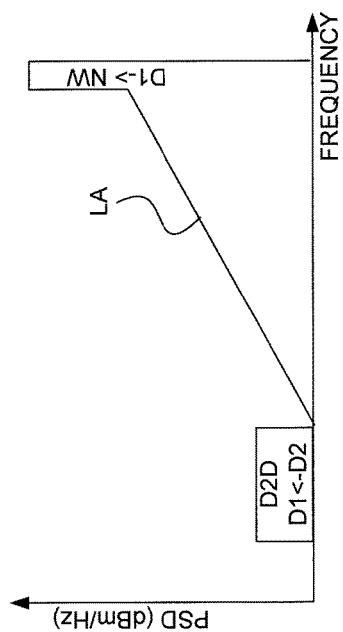

FIG. 4 shows a schematic view of a computer-readable medium as described in the above. The computer-readable medium 40 is in this embodiment a data disc 40. In one embodiment the data disc 40 is a magnetic data storage disc. The data disc 40 is configured to carry instructions 41 that when loaded into a controller, such as a processor, executes a method or procedure according to the embodiments disclosed above. The data disc 40 is arranged to be connected to or within and read by a reading device 42, for loading the instructions into the controller. One such example of a reading device 42 in combination with one (or several) data disc(s) 40 is a hard drive. It should be noted that the computer-readable medium can also be other mediums such as compact discs, digital video discs, flash memories or other memory technologies commonly used.

The instructions 41 may also be downloaded to a computer data reading device 44, such as a computer or other device capable of reading computer coded data on a computer-readable medium, by comprising the instructions 41 in a computer-readable signal 43 which is transmitted via a wireless (or wired) interface (for example via the Internet) to the computer data reading device 44 for loading the instructions 41 into a controller. In such an embodiment the computer-readable signal 43 is one type of a computer-readable medium 40.

The instructions may be stored in a memory (not shown explicitly in FIG. 4, but referenced 240 in FIG. 2) of the radio frequency communication device 100.

References to computer programs, instructions, code etc. should be understood to encompass software for a programmable processor or firmware such as, for example, the programmable content of a hardware device whether instructions for a processor, or configuration settings for a fixed-function device, gate array or programmable logic device etc.

Figure 7:
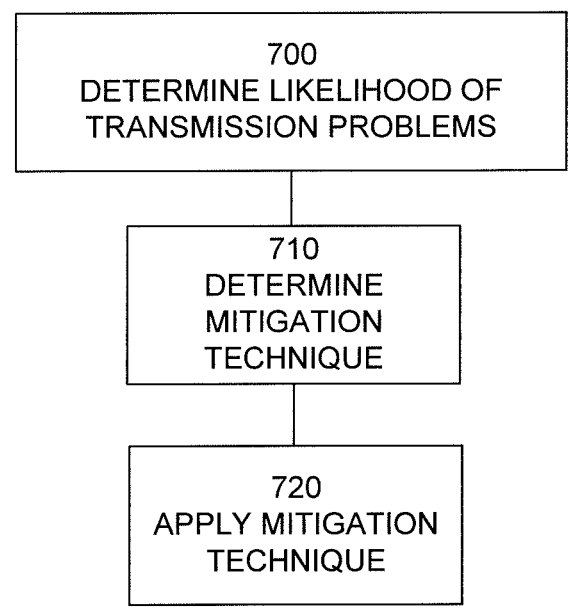
FIG. 7 shows a flow chart for a general method according to an embodiment of the teachings of this application.

FIG. 7 shows a general method according to the teachings herein. The first radio frequency communication device 320 determines 700 if a power imbalance (due to simultaneous transmission to the network node 310 and reception from the peer device or vice versa) will be likely to cause or is currently causing a transmission or reception problem on one or both links. If the radio frequency communication device 320 determines that such a problem can occur in the forthcoming communication or is occurring in the current communication, then the radio frequency communication device 320 determines 710 an appropriate solution or mitigation technique. The radio frequency communication device 320 may be configured to determine that the mitigation technique should involve prioritizing transmissions/receptions between D2D links (D2D TX/RX) and network links (NW TX/RX). Additionally or alternatively, the radio frequency communication device 320 may be configured to determine that the mitigation technique should involve directly reducing a transmission power level. Also, other mitigation techniques are plausible. As a mitigation technique has been determined, the radio frequency communication device 320 then applies 720 the selected solution or mitigation technique during a subsequent data communication period (for example during a next subframe or over certain time period).

The radio frequency communication device 320 may be configured to apply one or more such mitigation techniques autonomously, that is by its own accord. Additionally or alternatively, the radio frequency communication device 320 may be configured to apply one or more such mitigation techniques based on pre-defined rules. Additionally or alternatively, the radio frequency communication device 320 may be configured to receive a configuration from the network node 310 and to apply one or more such mitigation techniques based on a received configuration. Combinations of how the radio frequency communication device 320 applies the mitigation techniques are of course possible. The radio frequency communication device 320 may also be configured to report any mitigation technique to the network node 310 or the second radio frequency communication device 325 to enable them to adapt their transmissions accordingly.

Figure 8:
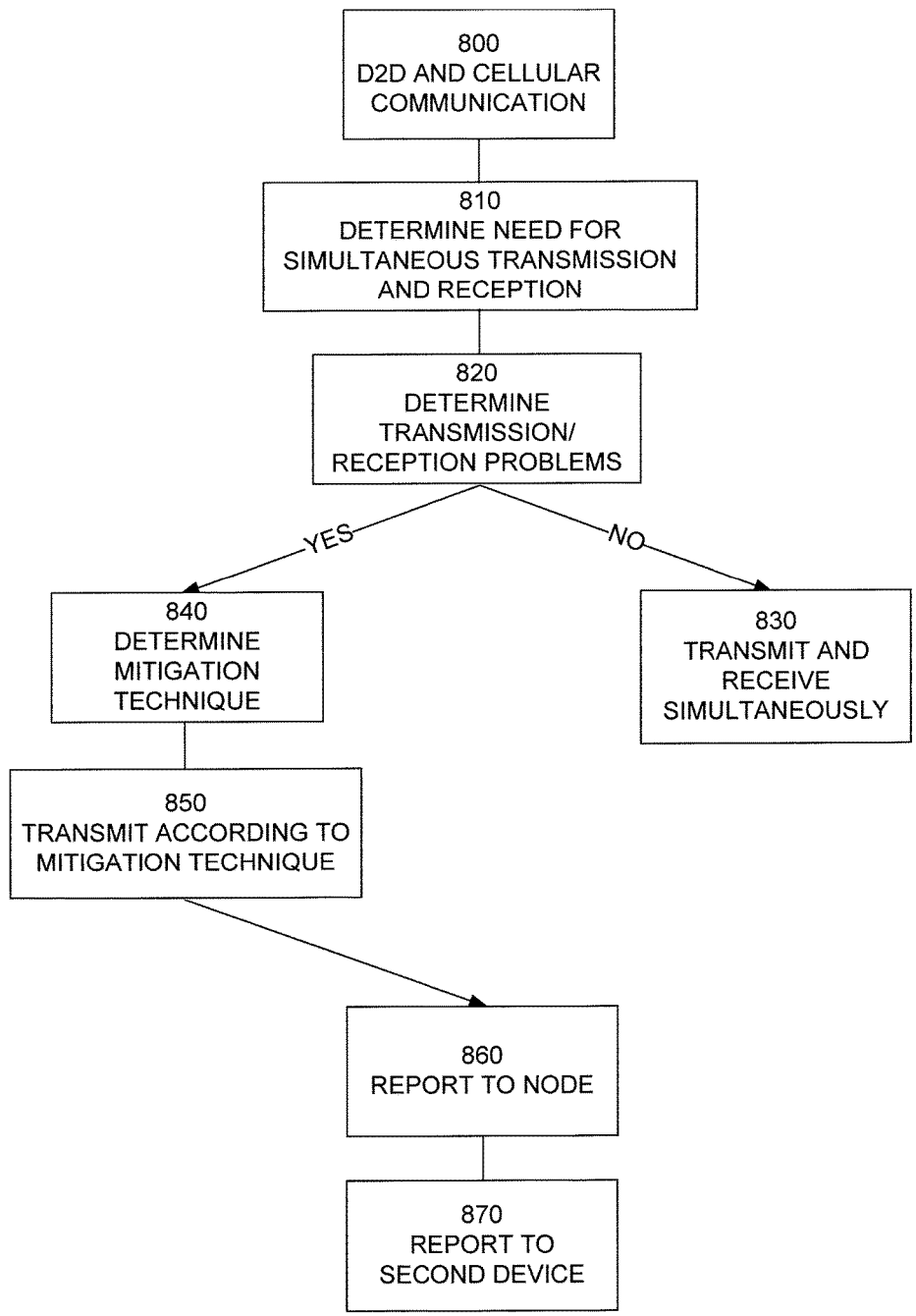
FIG. 8 shows a flow chart for a general method according to an embodiment of the teachings of this application.

Referring to FIG. 8 being a flowchart of a general method according to herein, a radio frequency communication device 320 is connected 800 to a network node 310 as well as being in communication with a second radio frequency communication device 325 over a D2D link. In some embodiments the same frequency band (UL resources, UL band, DL resources, DL band) are used for network (cellular) communication and D2D communication. In some embodiments the D2D (time/frequency) resources may be pre-allocated for a time period by a network node 310 controlling the first radio frequency communication device 320. The radio frequency communication device 320 also receives scheduling grants from the network node 310, giving an indication that an UL transmission to the network node 310 is needed.

The UL transmission can be a data channel (e.g. PUSCH in case of LTE) or a control channel (e.g. PUCCH in case of LTE). The radio frequency communication device 320 determines that the radio frequency communication device 320 is scheduled for a D2D reception and a network (cellular) transmission in the same sub frame, however in different frequency resources 810. The detection may be done by determining a request, via a scheduling grant from the network node 310, to send UL information in a sub frame in which the radio frequency communication device 320 should receive from the second radio frequency communication device 325 in the D2D communication. A first set of resources is allocated to the network (cellular) transmission and a second set of resources is allocated to D2D reception/communication, possibly by the second radio frequency communication device 325. A controller in the radio frequency communication device 320 determines 820 whether there will be any problem associated with the simultaneous transmission and reception.

In one embodiment the controller in the radio frequency communication device 320 determines 820 whether there will be any problem associated with the simultaneous transmission and reception by determining if there is a likelihood for such a problem. The likelihood for a problem may be based on a current signal environment, which in turn may be defined by current noise or interference levels. For example, if there has been a trend in rising noise levels, the controller may be determined that there is a likelihood that problems will occur in the next transmissions/receptions and may thus, proactively, determine that there is a problem.

Different problems may be expected. For instance, the transmission power may be larger than a threshold indicating that there is a risk for transmission leakage problem, as described above. If no problem is detected, then the radio frequency communication device 320 proceeds with the simultaneous communication 830.

However, if a problem is detected, the radio frequency communication device 320 determines one or more mitigation techniques to solve the problem 840. The radio frequency communication device 320 may also be configured to decide not to perform simultaneous network (cellular) transmission and D2D reception or vice versa until the detected problem does no longer exist or until a certain time period has expired. The selected mitigation technique(s) is then applied by the radio frequency communication device 320 or possibly communicated to the network node 310 and/or the second radio frequency communication device 325 for application.

In general in response to detection of transmission and reception problem, the mitigation technique applied by the radio frequency communication device 320 comprises at least one of the prioritization between reception on D2D or network (cellular) transmission, restricted network (cellular) transmission or adjustment of network (cellular) transmission power (alternatively D2D transmission power).

There are several more possible mitigation techniques and variants which will be discussed in detail below.

A first general mitigation technique is to prioritize between D2D reception and network (cellular) transmission. Some examples of prioritization rules are to prioritize network (cellular) transmission over D2D reception, prioritize network (cellular) control data communication (such as RRM/RRC) over D2D reception, prioritize D2D reception over transmitting a scheduling request, prioritize D2D control data reception over network (cellular) data communication, prioritize based on a number of HARQ transmission (i.e. retransmission n higher priority than m if n>m). This means reception of retransmission n in D2D link has higher priority than transmission of retransmission m in the UL. Also the opposite holds, i.e. transmission of retransmission n in the UL has higher priority than reception of retransmission m in the D2D link. Furthermore, a mitigation technique may be to prioritize signal measurements for the reception over a network (cellular) transmission. Similar prioritization rules could also be applied to the case with simultaneous cellular reception and D2D transmission.

A second general mitigation technique is to adapt or adjust the transmission power. In one embodiment the radio frequency communication device 320 is configured to adjust (lower) the transmission power level on the UL transmission such that the inband emission will not interfere with the D2D reception. The radio frequency communication device 320 may be configured to determine whether the inband emission will interfere or not by having initial knowledge of the inband emission level, either based on a predefined specification requirement (i.e. −30 dBc relative transmitted power spectral density (dBm/Hz)) or based on a measured inband emission level (either measured in lab, or based on real time measurements). The radio frequency communication device 320 determines whether it is possible to lower the transmission level (and still making it possible for the network node 310 to successfully receive the information) so that reception is possible. This approach might be applicable in case of a relative high RX level (say −60 dBm) and low transmission level (say −30 dBm).

In one embodiment the radio frequency communication device 320 is configured to adapt the network (cellular) transmission power level by transmitting an adapted transmission power level to said network node 310 for adapted transmission to said radio frequency communication device 320 from said network node 310 thereby enabling a mitigation of a transmission power leakage even when not actively transmitting.

In one embodiment the radio frequency communication device 320 is configured to a D2D transmission power level by transmitting an adapted transmission power level to said second radio frequency communication device 325 for adapted transmission to said radio frequency communication device 320 from said second radio frequency communication device 325 thereby enabling a mitigation of a transmission power leakage even when not actively transmitting A third general mitigation technique is to restrict the transmission. The radio frequency communication device 320 is configured to only transmit a fraction of the network (cellular) communication information. For instance, if the network node 310 sends uplink grant for a data channel transmission (e.g. PUSCH) which includes uplink feedback information (e.g. HARQ (Hybrid Automatic Repeat request), PMI (Pre-coding Matrix Indicator), CQI (Channel Quality Information) information etc), the radio frequency communication device 320 may instead transmit a control channel (e.g. PUCCH) including only the uplink feedback information (e.g. HARQ and CQI information etc) or even selected uplink feedback information (e.g. only HARQ). One advantage with this approach is that the narrowband PUCCH is transmitted at the band edge and hence the inband emission might be much lower on the PRBs used for D2D communication (and hence reception). Then it is possible to transmit the restricted transmission over the network (cellular) link and simultaneously receive on the D2D link. In an alternative or additional embodiment the radio frequency communication device 320 may only transmit a subset of the allocated resource blocks to the network node 310. For example, the radio frequency communication device 320 only transmits on 5 RBs instead of 10 RBs. Similar to the second general mitigation technique above this approach is suitable if reception signal level is high and the (original) transmission signal level is low.

A fourth general mitigation technique is to discontinuously transmit on the network (cellular) link. The radio frequency communication device 320 detects the problem and in response thereto starts to transmit to the network node 310 over a network (cellular) link infrequently according to a transmission pattern, which is termed here as discontinuous signal transmission pattern (e.g. transmitting during one (ON) one subframe out of N consecutive available subframes; N can for example be 10 or 20 subframes). The transmission pattern therefore comprises ON and OFF time periods. During an OFF time period, the radio frequency communication device 320 does not transmit to the network node 310. During the OFF time period, the radio frequency communication device 320 receives signals over the D2D link as usual. During ON time periods, the radio frequency communication device 320 either does not receive from the second radio frequency communication device 325 on a D2D link or the second radio frequency communication device 325 transmits using a more robust MCS (e.g. QPSK and/or low code rate like 1/3) and/or by using higher output or transmission power. In this manner the radio frequency communication device 320 is also able to simultaneously receive the signals from the second radio frequency communication device 325 over the D2D link while transmitting on the network (cellular) transmission link during the transmit pattern's ON time period. The pattern may be pre-defined or it may be configurable by the network node 310 as explained above.

A fifth general mitigation technique is to discontinuously receive over the D2D reception link. The radio frequency communication device 320 detects the problem and in response thereto starts to receive on the D2D reception link from the second radio frequency communication device 325 with which it is involved in D2D communication within a discontinuous reception mode. For example, during one subframe time period out of K consecutives available subframes (e.g. K can be 10 or 20 subframes) the radio frequency communication device 320 is receiving. The receive pattern therefore comprises of ON and OFF time periods. During an OFF time period, the radio frequency communication device 320 does not receive from the second radio frequency communication device 325 over the D2D reception link, but transmits to the network node 310 over the network (cellular) transmission link. During an ON time period, the radio frequency communication device 320 receives signals from the second radio frequency communication device 325 over the D2D reception link. Also during an ON time period, the radio frequency communication device 320 does not transmit to the network node 310 over the network (cellular) transmission link or the radio frequency communication device 320 transmits using low output or transmission power. The transmission power may be below a threshold to avoid degradation of signal quality. In this manner the radio frequency communication device 320 is also able to simultaneously receive the signals from the second radio frequency communication device 325 over the D2D reception link while transmitting over the network (cellular) transmission also during the receiver pattern's ON time period. The second radio frequency communication device 325 may also be informed when the first radio frequency communication device 320 starts the pattern by the first radio frequency communication device 320 or by the network node 310. The time when the radio frequency communication device 320 starts the pattern may also be based on a pre-defined rule (e.g. first device uses pre-defined pattern when signal quality is below a threshold). In response thereto, the second radio frequency communication device 325 also starts to transmit to the first radio frequency communication device 320 using D2D communication only during an ON time period. The pattern may be pre-defined or configurable by the network node 310 as explained above.

A sixth general mitigation technique is to adapt the receiver. The radio frequency communication device 320 detects the problem, and in response thereto, adapts one or more parameters related to its receiver, the receiver being part of the radio frequency communication interface 130, to enhance signal reception quality. Alternatively or additionally, the radio frequency communication device 320 starts to use an enhanced receiver (also being part of the radio frequency communication interface 130) for receiving signals from the second radio frequency communication device 325 over the D2D reception link. An enhanced receiver is capable of mitigating the interference more effectively than the baseline receiver. An enhanced receiver herein refer to a receiver that is capable of mitigating interference caused by the leakage due to signals transmitted on the network (cellular) transmission link to the network node 310. Examples of enhanced receivers are successive interference cancellation (SIC) where the transmission emission is estimated and subtracted (this is possible since the device knows the signal to be transmitted, and may also have a mathematical model of the PA (and other) non-linearities that generate he inband emission), or maximum likelihood (ML) receivers etc.

Another example of adaptation of the receiver is to switch the receiver link bandwidth to a narrow band receiver link. The bandwidth is adapted to the D2D allocation bandwidth (for instance 6 PRBs) to filter out a possible strong transmission signal on adjacent PRBs. An adjustment of the local oscillator may also be performed. Such an adaptation of the local oscillator may be performed through switching the center frequency from the center of the system bandwidth (that might be 20 MHz, 100 PRBs) to the center of the D2D PRB allocation. This approach is especially suitable if the inband emission is of less problem, but the receiver signal dynamics (for instance ADC dynamic) is the limiting factor.

Alternatively or additionally, the radio frequency communication device 320 is configured to revert to the baseline receiver (being part of the radio frequency communication interface 130) when the problem is alleviated or reception quality of the D2D RX is within an acceptable limit, such as when SINR at the receiver of the radio frequency communication device 320 is above, say, −3 dB. The enhanced receiver consumes more power, involves more processing and implementation complexity compared to the baseline receiver. The enhanced receiver is therefore used only when the problem due to simultaneous D2D reception and NW transmission (or vice versa) persists. The interference mitigation performed by the radio frequency communication device 320 herein means reducing, minimizing, eliminating, cancelling, avoiding, rejecting etc., interference caused by the leakage due to the signals sent on the network (cellular) transmission link of the radio frequency communication device 320.

It should be noted that it is possible to combine the mitigation techniques disclosed above to a composite mitigation technique. Using a composite mitigation technique the radio frequency communication device 320 is configured to apply any combination of the alternatives described above.

The prioritization rule may be determined in several different ways.

In one embodiment, the prioritization rule is generated by the network node 310 and thus also configured by the network node 310. The network node 310 may use one or more conditions to generate the rule and configure the radio frequency communication device 320 to apply the rule(s). For example the network node 310 may receive signal quality measurement performed by the radio frequency communication device 320 on the signal received over the D2D reception link from a second radio frequency communication device 325 with which the first radio frequency communication device 320 is involved in D2D communication with. If the signal quality is below a threshold (e.g. SINR or SNR is below, say, −3 dB), then the network node 310 may configure the radio frequency communication device 320 to use a particular mitigation technique or plurality of techniques. For example, the radio frequency communication device 320 may be configured to perform an adjustment of the transmission power if both D2D reception and network (cellular) transmission is required to operate all the time simultaneously.

In an alternative or additional embodiment, the rule is defined by the standard (for instance 3GPP in case of LTE) in the form of a pre-determined rule. In this case one or more pre-defined rules are also associated with one or more triggering conditions. The triggering conditions enable the radio frequency communication devices 320 and also the network node 310 to determine and apply the pre-defined rules. For example, if the signal quality on the D2D reception link is below a threshold (e.g. −1 dB), then the radio frequency communication device 320 can only trigger discontinuous transmission on the network (cellular) transmission link. If the signal quality falls further below −3 dB then the radio frequency communication device 320 can also trigger discontinuous reception on the D2D reception link. If the signal quality increases to 0 dB then the radio frequency communication device 320 is enabled to turn off both schemes (discontinuous transmission and discontinuous reception) and revert to normal operation i.e. perform D2D reception and network (cellular) transmission simultaneously during the assigned resources. Alternatively, the radio frequency communication device 320 informs the network node 310 and/or the second radio frequency communication device 325 about the currently applied rule(s), after having selected a rule. This enables the network node 310 and the second radio frequency communication device 325 to determine the impact on its own reception and transmission of signals respectively. The network node 310 and the second radio frequency communication device 325 can, in turn, apply a suitable mitigation technique to avoid performance degradation. For example if the radio frequency communication device 320 is using transmission power adjustment on the network (cellular) transmission link, then the network node 310 may use a more robust receiver that can receive a signal whose signal level is below a threshold or whose received signal quality is below a threshold.

In an alternative or additional embodiment, the prioritization rule is determined by the network node 310 based on a negotiation between the network node 310, and the radio frequency communication devices 320, 325 involved in the D2D communication. In one example the network node 310 may configure the radio frequency communication device 320 with the rule and the associated parameters e.g. threshold for triggering the rule. In another example the radio frequency communication device 320 informs the network node 310 upon detecting the problem. In response the network node 310 configures the radio frequency communication device 320 with the appropriate rule and associated parameters.

The prioritization rule may also be determined based on radio frequency communication device capabilities (e.g. type of radio access capability to operate or handle simultaneous signal transmission on network (cellular) transmission link and signal reception on D2D reception link may be reported by the radio frequency communication device 320 to the network node 310. The capability may also be signaled by the radio frequency communication device 320 to the second radio frequency communication device 325 capable of D2D communication. The capability information may also comprise specific mitigation techniques which the radio frequency communication device 320 is capable to apply in order to handle the simultaneous signal transmission over the network (cellular) transmission link and signal reception over the D2D reception link. For example a radio frequency communication device 320 may indicate that it supports all pre-defined mitigation techniques. In another example a device may indicate that it is capable of applying only (a) specific mitigation technique(s), such as prioritization between D2D reception and network (cellular) transmission and transmission power adjustment. The capability information may also indicate that the capability (or associated information) is applicable to all frequency bands or to specific frequency bands (e.g. E-UTRA band 1, E-UTRA band 7, all E-UTRA bands below 1 GHz etc). The radio frequency communication device 320 may signal the capability to any suitable network node 310 such as a serving NW node, core network node, positioning node etc. The network node 310 in turn uses that information to determine the priority rule used for that radio frequency communication device 320 to handle and mitigate the simultaneous D2D reception and network (cellular) transmission problem (or vice versa). For instance, one radio frequency communication device may have less inband emission and hence may be configured with restricted transmission possibilities while a low cost radio frequency communication device with large inband emission may be configured to prioritize transmission or reception. The network node 310 may also signal or forward the obtained device capability information to another network node, For example, a serving eNode B may signal this to a neighboring eNode B over X2 interface. The capability information may also be stored by the network node 310. The network node 310 may then use the stored (historical) data for applying or selecting the most suitable rule for the corresponding radio frequency communication device at a future time.

It could be noted that the prioritization may also be determined in a combination of the above manners, including one, several or all of the network node 310, the radio frequency communication device 230 and a communication standard.

The radio frequency communication device and/or the network node 310 may also be configured to update the prioritization rule dynamically. The network node 310 may update the priority rule each mode selection period (which may be in the order of 200-500 ms). Alternatively or additionally, the network node 310 may update the priority rule upon a detected event or condition. The event or condition and corresponding thresholds can be pre-defined or implementation specific.

One example of such an event is when a measurement report (e.g. signal quality (e.g. RSRQ), signal strength (e.g. RSRP), SINR, SNR, BLER, BER etc) performed by a radio frequency communication device (e.g. on D2D RX) involved in the D2D communication differs from a certain threshold. The network node 310 receives such reports from the radio frequency communication device. For example in one event it is above a first threshold. In a second event it is below a second threshold. The event may also be triggered by a measurement report performed by a second radio frequency communication device 325 connected to the network node 310.

Another example of such an event is when a measurement report (e.g. signal quality, signal strength, SINR, SNR, BLER, BER etc) performed by the network node 310 (e.g. on signal transmitted over the network (cellular) transmission link) differs from a certain threshold. For example in one event it is above a first threshold. In a second event it is below a second threshold.

The event may also be triggered by a measurement report performed by the network node 310 on signal transmitted by a second radio frequency communication device 325 over its network (cellular) transmission link.

Another example of such an event is when the cell load in a cell being served by the network node 310 changes, such as when the transmitted power differs from a threshold, the total resource usage (e.g. percentage of usage of UL and/or DL resource blocks) differs from a threshold, the number of users in a cell differs from a threshold, the number of users with D2D communication using network (cellular) transmission, and/or the number of users with simultaneous D2D reception and network (cellular) transmission etc. For example, if the cell load is high, then the network node 310 initiates one or more rules or change their priority order. If the upload cell load is above a threshold (i.e. based on one or more criteria such as UL resource usage etc), then the network node 310 may increase the priority of the rule such that both transmission power adjustment and discontinuous reception at the D2D reception link are of highest priority.

Another example of such an event is when a change of a state in any of the involved devices is detected. Examples of state changes are a cell change, a handover, a RRC (Radio Resource Control) connection re-establishment, a reconfiguration of connection, any of configuration, reconfiguration, activation or deactivation of one or more secondary cells (SCell) in CA, changing RRC states (e.g. from IDLE state to RRC connected or vice versa etc), configuration or reconfiguration or activation or deactivation of radio links involved in CoMP (Coordinated Multipoint transmission), power state in the device from ON to OFF (or vice versa).

Another example of such an event is when a change in a network node status is detected. Examples of such states are bi-states like a high load in the served cell, low load in the served cell, tri-state like high load, medium load or low load in the served cell, or power state of the network node 310 changing from ON state to OFF state due to power saving, maintenance activity etc.

It should be noted that the events disclosed in the above may also be combined into combination events. The network node 310 may use any combination of the events to update the priority of the rules. For example the network node 310 may only change the current priority order of the rules provided all events are detected.

The radio frequency communication device 320 may also be configured to report the selected mitigation technique (taken action) to the network node 310 or the second radio frequency communication device 325. In one embodiment, the report is made to the radio frequency communication device 320 whose communication was abandoned/restricted, but not to the other node. The report may be done in a sub frame where the communication is possible with the network node 310 or radio frequency communication device to receive the report.

To summarize with reference to FIG. 8, a radio frequency communication device 320 is connected to a network node 310 and is also involved in communication with another radio frequency communication device 325 via network (cellular) assisted D2D communication 800 using a same system frequency bandwidth as the NW communication. The radio frequency communication device 320 determines a need for simultaneous D2D reception and D2D Transmission 810 according to above. The radio frequency communication device 320 determines whether there is any problem associated with simultaneous transmission and reception 820. If not, the transmission/reception is made according to scheduled principles 830. If a problem is detected, the radio frequency communication device 320 (or the network node 310) determines a solution to solve the problem according to above 840. The radio frequency communication device 320 proceeds with the communication according to the selected mitigation technique 850. Optionally, the radio frequency communication device 320 reports 860 the selected mitigation technique at a later stage to the network node 310 or the radio frequency communication device 320 reports 870 the selected mitigation technique at a later stage to the second radio frequency communication device.

The embodiments above have been described in terms of assuming simultaneous transmission and reception in the same sub frame, but the embodiments are also applicable when the network (cellular) communication and D2D communication is not synchronized. For instance, a D2D sub frame may only partly overlap a sub frame for network (cellular) communication. Hence, the embodiments are also applicable to simultaneous transmission and reception over a subset of OFDM symbols in a sub frame.

In the description we have assumed UL resources used for D2D communication, but the embodiments of invention also covers that DL resources are used for D2D. All above apply to that case with the change to simultaneous D2D transmission and network node reception.

The disclosed embodiment provides consistent strategies for a radio frequency communication device handling scenarios involving simultaneous transmission and reception. Furthermore, overall robustness in the communication system is also provided.

In the description above there has been focus on an LTE system and OFDM, however the teachings herein are not limited to this case. Furthermore, the denominator network node may be an eNode B, node B, Base Station, wireless access point (AP), base station controller, relay, donor node controlling relay, base transceiver station (BTS), transmission points, transmission nodes, RRU, RRH, nodes in distributed antenna system (DAS) etc. Furthermore, a radio frequency communication device may be an UE, sensor, lap top modem, smart phone, machine type (MTC) device, PDA, iPAD, Tablet, smart phone, laptop embedded equipped (LEE), laptop mounted equipment (LME), USB dongles etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A first radio frequency communication device comprising a radio frequency communication interface and a controller, wherein said controller is configured to:
    establish a network communication link with a network node and said first radio frequency communication device and to
    establish a device-to-device communication link with a second radio frequency communication device and said first radio frequency communication device via said radio frequency communication interface;
    determine a simultaneous communication in a subframe interval is to be performed comprising either:
    a network transmission over said network communication link with said network node and said first radio frequency communication device and a D2D reception over said device-to-device communication link with said second radio frequency communication device and said first radio frequency communication device; or
    a network reception over said network communication link with said network node and said first radio frequency communication device and a D2D transmission over said device-to-device communication link with said second radio frequency communication device and said first radio frequency communication device;
    determine there is a transmission problem related to said simultaneous communication in said subframe interval;
    determine a mitigation technique for reducing adjacent channel interference; and
    perform said simultaneous communication of said network transmission and said D2D reception or said simultaneous communication of said network reception and said D2D transmission according to said mitigation technique to mitigate said transmission problem.

2. The first radio frequency communication device according to claim 1, wherein said controller is configured to adapt a transmission power level according to said mitigation technique.

3. The first radio frequency communication device according to claim 2, wherein said transmission power level is related to the network transmission.

4. The first radio frequency communication device according to claim 3, wherein said transmission power level is related to a network transmission power level and to a D2D transmission power level, wherein said controller is configured to adapt either said network transmission power level and/or a D2D transmission power level, wherein a transmission power level may be related to a corresponding reception power level.

5. The first radio frequency communication device according to claim 4, wherein said controller is configured to adapt said transmission power level by increasing or decreasing either of said network transmission power level and said D2D transmission power level, so that a difference between a reception power level and a transmission power level is below a threshold level.

6. The first radio frequency communication device according to claim 2, wherein said transmission power level is related to the D2D transmission.

7. The first radio frequency communication device according to claim 2, wherein said controller is configured to adapt said transmission power level by decreasing said transmission power level.

8. The first radio frequency communication device according to claim 2, wherein said controller is configured to adapt said transmission power level by scaling said transmission power level.

9. The first radio frequency communication device according to claim 2, wherein said controller is configured to adapt said transmission power level by transmitting an adapted transmission power level to said network node for adapted transmission to said first radio frequency communication device from said network node.

10. The first radio frequency communication device according to claim 2, wherein said controller is configured to adapt said transmission power level by transmitting an adapted transmission power level to said second radio frequency communication device for adapted transmission to said second radio frequency communication device from said first radio frequency communication device.

11. The first radio frequency communication device according to claim 1, wherein said controller is configured to restrict transmission on one of said network transmission power or D2D transmission power, by restricting the information to be transmitted.

12. The first radio frequency communication device according to claim 1, wherein said controller is configured to prioritize one of said network transmission and said D2D reception or said network reception and said D2D transmission, and only perform the prioritized communication according to said mitigation technique.

13. The first radio frequency communication device according to claim 1, wherein said controller is configured to prioritize a transmission of a signal or physical channel which carries control information according to said mitigation technique.

14. The first radio frequency communication device according to claim 1, wherein said mitigation technique is based on pre-defined rules stored in a memory comprised in said first radio frequency communication device.

15. The first radio frequency communication device according to claim 14, wherein said pre-defined rules relate to at least one of a condition of said first radio frequency communication device and a triggering event.

16. The first radio frequency communication device according to claim 15, wherein said controller is configured to transmit at least one of capability information of said first radio frequency communication device, which capability information indicates that the first radio frequency communication device is capable of performing said simultaneous network transmission and said D2D reception or said simultaneous network reception and said D2D transmission according to one or more mitigation techniques to mitigate the transmission problem, and a measurement report to said network node where said network node to base a selection of said mitigation technique on.

17. The first radio frequency communication device according to claim 1, wherein said controller is configured to determine said mitigation technique by receiving said mitigation technique or information associated with the said mitigation technique from said network node.

18. The first radio frequency communication device according to claim 1, wherein said controller is configured to receive an indication or message from said network node, and in response thereto determine said mitigation technique.

19. The first radio frequency communication device according to claim 1, wherein said controller is configured to determine if there is a transmission problem related to said simultaneous transmission and reception based on an imbalance of transmission power and reception power.

20. The first radio frequency communication device according to claim 1, wherein said controller is configured to determine if there is a transmission problem related to said simultaneous transmission and reception by determining if there is a likelihood for such a problem.

21. The first radio frequency communication device according to claim 1, wherein said controller is configured to transmit a report to said network node, wherein said report includes said mitigation technique and/or said detected problem.

22. The first radio frequency communication device according to claim 1, wherein said controller is configured to transmit a report to said second radio frequency communication device, wherein said report includes said mitigation technique and/or said detected problem.

23. The first radio frequency communication device according to claim 1, wherein said controller is configured to detect an event and in response thereto update said mitigation technique.

24. A method for use in a first radio frequency communication device comprising a radio frequency communications interface and a controller, said method comprising:
establishing a network communication link with a network node and said first radio frequency communication device, and to
establish a device-to-device communication link with a second radio frequency communication device and said first radio frequency communication device via said radio frequency communication interface;
determining a simultaneous communication in a subframe interval is to be performed comprising either a network transmission over said network communication link with said network node and said first radio frequency communication device and a D2D reception over said device-to-device communication link with said second radio frequency communication device and said first radio frequency communication device, or a network reception over said network communication link with said network node and said first radio frequency communication device and a D2D transmission over said device-to-device communication link with said second radio frequency communication device and said first radio frequency communication device;
determining there is a transmission problem related to said simultaneous communication in said subframe interval;
determining a mitigation technique for reducing adjacent channel interference; and
performing said simultaneous communication of said network transmission and said D2D reception or said simultaneous communication of said network reception and said D2D transmission according to said mitigation technique to mitigate said transmission problem.

25. A non-transitory computer readable storage medium encoded with instructions that, when loaded and executed on a processor, causes the method according to claim 24 to be performed.

26. A network node comprising a radio frequency communications interface and a controller, said network node being configured to serve at least one first radio frequency communication device being configured for both a network communication link and for a device-to-device communication link with a second radio frequency communication device, wherein said controller is configured to:
determine a mitigation technique for reducing adjacent channel interference to mitigate a problem related to transmission or reception of signals experienced by, or expected to be experienced by, the first radio frequency communication device for either simultaneous network transmission over said network communication link with said network node and said first radio frequency communication device and a D2D reception over said device-to-device communication link with said second radio frequency communication device and said first radio frequency communication device in a subframe interval, or for simultaneous network reception over said network communication link with said network node and said first radio frequency communication device and a D2D transmission over said device-to-device communication link with said second radio frequency communication device and said first radio frequency communication device in a subframe interval; and
transmit said mitigation technique to said first radio frequency communication device to allow simultaneous communications in said subframe interval.

27. The network node according to claim 26, wherein said controller is further configured to determine said mitigation technique based on pre-determined rules.

28. The network node according to claim 26, wherein said controller is further configured to receive at least one of capability information of said first radio frequency communication device, which capability information indicates that the first radio frequency communication device is capable of performing said network transmission and said D2D reception or said network reception and said D2D transmission according to one or more mitigation techniques to mitigate the transmission problem, a measurement report and an indication of a detected problem from said first radio frequency communication device and to determine said mitigation technique based on said at least one received capability report, measurement report or indication of a detected problem.

29. The network node according to claim 28, further comprising a memory, and wherein said controller is further configured to store said capability of said first radio frequency communication device for future use.

30. The network node according to claim 28, wherein said controller is further configured to transmit said capability of said first radio frequency communication device to a second network node.

31. The network node according to claim 26, wherein said controller is further configured to perform a measurement and generate a measurement report and to determine said mitigation technique based on said generated measurement report.

32. The network node according to claim 26, wherein said controller is further configured to perform a radio operational task, wherein said radio operational task comprises adapting at least one parameter related to resources assigned to said first radio frequency communication device for transmission over one of or both of a transmission to said network node or said second radio frequency communication device.

33. The network node according to claim 26, wherein said controller is further configured to receive an adapted transmission power level from said first radio frequency communication device and to transmit to said first radio frequency communication device according to said adapted transmission power level.

34. The network node according to claim 26, wherein said controller is further configured to detect an event and in response thereto update said mitigation technique.

\* \* \* \* \*